Jan. 4, 1966   J. H. BERTIN ETAL   3,227,373
FOG DISPERSAL METHOD
Original Filed Sept. 17, 1963   2 Sheets-Sheet 2
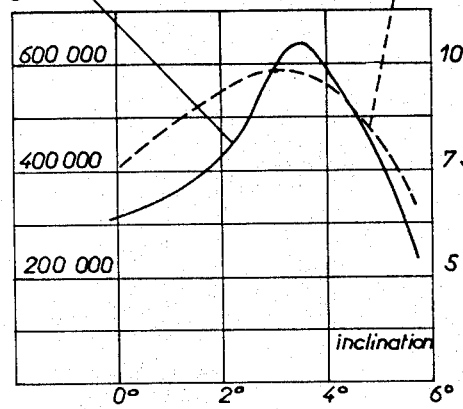
Curves of volumes and areas of contact of the jet with the ground versus inclination.
Fig.:4
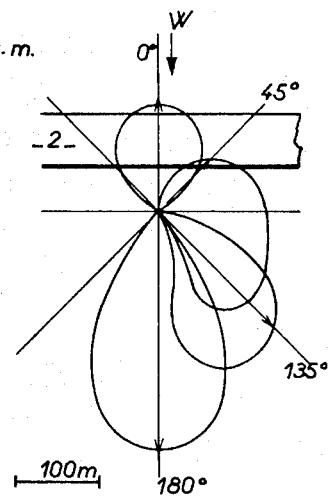
Fig.:7
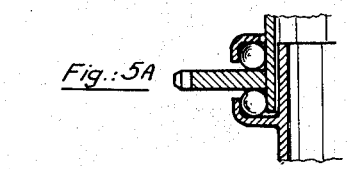
Fig.:5A
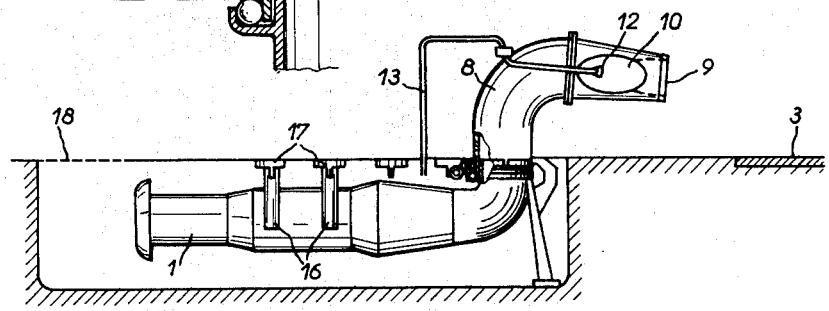
Fig.:5
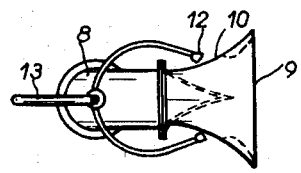
Fig.:6

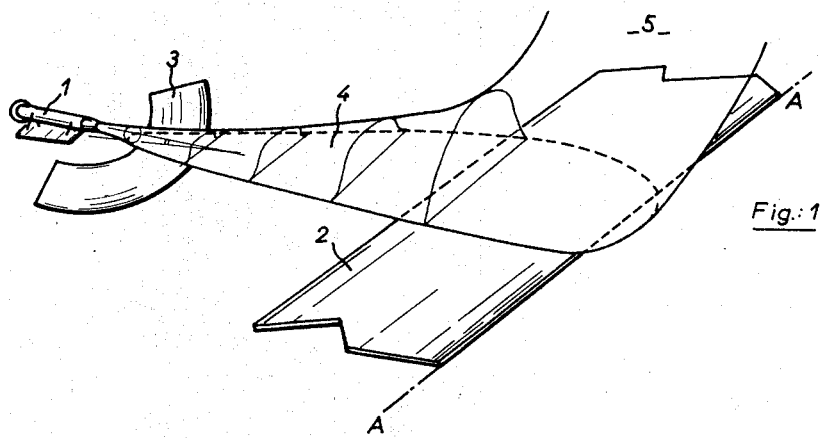
Fig.:1
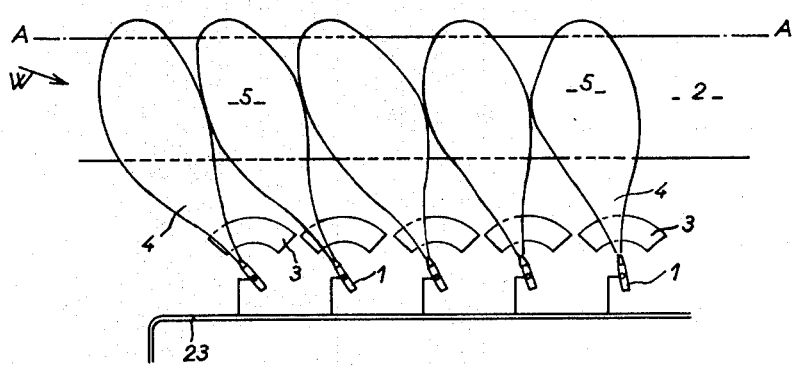
Fig.:2
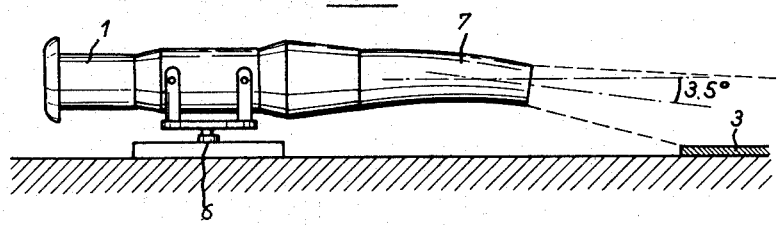
Fig.:3

United States Patent Office 3,227,373
Patented Jan. 4, 1966

3,227,373
FOG DISPERSAL METHOD
Jean Henri Bertin, Neuilly-sur-Seine, and Ernest Dubois, Fontenay-aux-Roses, France, assignors to Societe Bertin & Cie, Paris, France, a company of France
Original application Sept. 17, 1963, Ser. No. 309,505. Divided and this application Sept. 29, 1964, Ser. No. 399,976
Claims priority, application France, July 1, 1958, 769,237, Patent 1,207,634
8 Claims. (Cl. 239—2)

This is a divisional application of our application Serial No. 309,505 filed September 17, 1963, which itself is a continuation-in-part of our application Serial No. 823,934 filed June 30, 1959, now abandoned.

Various processes and devices have already been proposed for dispersing fog, at least temporarily, in a zone where it hinders human activities, especially over aerodromes where reduced visibility may cause all aerial traffic to be stopped.

Thus, for example, Patent No. 2,756,097 to Brandau teaches the modification of the physical equilibrium between thermodynamic forces and electric forces exerted on water particles forming clouds and fog, by injecting water into the high-temperature exhaust gas of an aircraft engine, in order to produce dry steam which is distributed through the atmosphere. Such a distribution brings about a modification of the electrical equilibrium of certain clouds which eventually causes these clouds to be dispersed or the particles forming them to be precipitated. The electric action of steam is furthered if the injected water contains ionizable salts.

However economical such a process—which will be hereafter designed as "ionic"—may be, it nevertheless relies on the electric constitution of clouds which is not well known and is moreover variable.

An object of the present invention is to provide a thermal and aerodynamic method—rather than an ionic one—which will reliably clear up, during foggy weather, a volume of space extending above an aerodrome runway and thus enable aircraft to land. The said method distinguishes over prior thermal method in several aspects which result in a reduction in overall size and cost price as well as in time-lag for starting it.

A further object of this invention is to provide such a thermal and aerodynamic method which will clear up, during foggy weather, a volume of space extending above a given ground area, for instance a landing runway, despite possible cross winds and without parts of the device constituting obstacles to rolling in the immediate vicinity of the limits of this area.

It has already been proposed, as for example in British Patent No. 587,521 to General Electric Company Ltd., to embed within the soil around an aerodrome runway a multiplicity of outlets fed with treated air—i.e. in general, warm air—through pipes and forming fluid screens or barriers which move sufficiently away from the ground to counteract the drift of the fog or cleared-up volume due to the wind.

Tests have shown that a fluid barrier which is thick enough not to rip under the action of the wind against which it stands, will bow because of the differential pressure (windward overpressure and leeward vacuum) and may even return to the ground at some distance from its point of emission. These tests have also established that durable stability of such fluid barriers was difficult to achieve and that periodic fluctuations were to be feared.

Moreover the outlets and their pipes must lie in close proximity to the sides of the runway, which is a drawback.

In the case of an aerodrome runway, the volume to be cleared up is very huge and so is the amount of heat to be supplied in order to evaporate the fog. Now this amount of heat being conveyed by an air flow, if the heated air were discharged at low speed, its temperature must be also low or otherwise the major portion of the heat will be lost owing to the Archimedean effect. Now, such a low-temperature flow requires pipes and discharge orifices of a size which is impracticable. Therefore this low discharge speed solution is not the good one and it has only given up to now inadequate results.

The use of high speeds (and of high temperatures) involves enormous energies which are difficult to consider with conventional engines and blowers.

Turbojets arranged in accordance with the invention with their jets inclined toward the ground to which they adhere, offer on the other hand an adequate solution to the problem under consideration:

(1) The high temperature of the gases allows keeping the discharge flows of air within reasonable magnitudes, and (2) The high kinetic energy which is here obtained, allows avoiding a premature rise of the hot air, the mixture zone remaining protected against the Archimedean effect by sticking to the ground.

In accordance with the present invention, several jet engines and preferably turbojets are positioned outside a zone over which fog is to be dispersed and each of these engines is provided with a jet nozzle, for the discharge of high-speed hot gases, which opens above and towards the ground, thus enhancing dilution of the hot gases in ambient air, this nozzle allowing furthermore to direct the jet so as to counter-balance the action of the wind.

The nozzles are spaced from the outer boundary of the zone by a distance which may be as wide as a few scores of meters. The ground is conveniently coated with a heat-resisting material such as a metal or a refractory at the point of contact with the jet.

The jet engines may be integral with their respective nozzles, each unit being supported by a substantially vertical pivot. They may be accommodated in tranches beneath the ground level. As an alternative, the nozzle alone may be orientable in a substantially horizontal plane. It may moreover be provided with noise suppressing means.

Tests have shown that there was an optimum value around 3.5° for the angle of ejection of the jet relative to the ground, this value corresponding to maximums of the volume in which the atmosphere is transparent and of the ground area of this cleared volume.

The quick dilution of the high-speed hot gases of a jet converted into a sheet adhering to the ground by the mere inclination of the nozzles towards the latter allows using without deep modifications turbojets or other jet engines which are still in a running condition but which have exceeded their normal potential duty for the propulsion of aircraft. The installation cost of the device of the invention is thereby greatly reduced, considering its effectiveness compared with known thermal devices.

The jet engines used in the present invention deliver an important thermal energy and especially kinetic energy for a very small overall size of the material used. This kinetic energy plays an essential part in the phenomenon of dilution of the jet by spreading out over the ground, in giving the device a substantial range and above all in counteracting the influence of the wind. To sum up, the total thermal power required for keeping transparent despite the wind a given volume of atmosphere, originally misty, is less than what it would have been, had the treated air been emitted at a low speed.

In the accompanying drawings:

FIG. 1 is a diagrammatic perspective view of a plant according to the present invention.

FIG. 2 is a corresponding plan view on a reduced scale.

FIG. 3 illustrates on a larger scale, in elevation, a pivotable turbojet having a nozzle inclined toward the ground.

FIG. 4 is a diagram showing the existence of an optimum inclination of the nozzle toward the ground.

FIG. 5 shows in elevation an alternative form according to which a turbojet positioned beneath the ground level within a pit is equipped with an orientatable nozzle.

FIG. 5A is an enlargement of a portion of FIG. 5.

FIG. 6 is a corresponding plan view of the nozzle of FIG. 5.

FIG. 7 is a diagram illustrating in plan view, in the case of a given wind, the adhesion surfaces of a hot jet on the ground, corresponding to various orientations of a turbojet.

The principle of the invention, as illustrated by the drawings, consists in using jet engines positioned outside and at a distance of the area over which the atmosphere is to be cleared, these engines generating hot gaseous jets inclined toward the ground and moreover orientatable in a plane, the initial speed of these jets being preferably greater than 150 meters/sec. The phenomena produced by these particular arrangements divide up into two zones. In the former one, the inclination of the jet toward the ground causes this jet to meet the ground before reaching the runway and to be converted into a sheet adhering to the ground. There is then produced an important dilution of the hot gases with ambient air, the contact surface of the hot jet with the ground being far greater than that which would be obtained, had the jet been parallel to the ground. The adhesion to the ground is such that the whole mixture occupies a volume in contact with the ground without any exertion, throughout this former part of the jet, of the ascending effect due to the temperature of the mixture and to Archimedean forces.

In this former zone, owing to the adhesion to the ground of the hot air sheet due to the high speed of the jet as it issues from the nozzle, the local wind acts solely on the geometric shape of the said volume in a horizontal plane. This former part of the jet is not used for producing the contemplated effect of fog dispersal because the gases have too great a speed. As a consequence, the turbojets or more simply their nozzles are at a sufficiently large distance from the runway not to constitute an obstacle for an aircraft casually swerving from it. This distance is of 50 to 70 m. from the edge of the runway according as the output of the jet engine varies between 2500 and 4000 kgs. thrust.

The laws of deformation of the sheet have been experimentally determined (see FIG. 7) and this provides a definite knowledge of the zone in which the second part of the phenomenon takes place with a wind having a given direction and speed, i.e. the zone in which a large base area, ascending column is formed wherein the heated air has altogether a small ascending speed, a small transverse mean speed and reduced local speeds of turbulence.

The distance apart of the jet engines which are spaced along the runway to produce a continuous clearing up, is about 80 to 90 meters according to the output, for a maximum wind speed of 4 meters/sec. (this is the limiting speed of winds by foggy weather). Too large an interval would bring about, in case of wind, an undesirable introduction of fog by induction between two jet engines, especially in case of cross wind.

It has been noticed that if the initial direction of the jet is at about 3.5° with the ground the cleared-up area, and therefore also volume, is at a maximum. This angular range has been defined in practice both by visibility measurements during fog dispersal and by visualization with the assistance of smoke. Tests have shown that, for a smooth ground (beaten earth or cement), the inclination angle of the jet toward the ground could be slightly greater than for a rough ground (gas of various size).

If the inclination is too large (more than 10°), the spreading out is too important, the speed is slowed down and energy wasted, thus causing premature separation of the flow and a substantial decrease of the cleared up volume.

If on the other hand the inclination is too small, the jet does not stick to the ground, its dilution is less important, its mean temperature remains very high and gives to such a jet two large an ascending speed. The cleared-up volume is here again reduced and is not located in the requested zone.

The control system of the device to be described in detail hereafter, boils down to the starting and output controls of each engine which are conventional and determine the power of each jet, and to the directional controls of each jet in order to adjust the location of the cleared-up volume taking into account the wind. The general arrangement of the jet engines with respect to the zone to be cleared up is selected in taking into consideration the prevailing winds, the speeds of which during foggy weather remain fortunately low. In order to take care of all wind direction conditions, it is advisable to distribute the engines on both sides of the runway above which it is desired to maintain a transparent volume of air.

The orientation of the nozzles should be foremost determined as a function of the direction and speed of the wind, in accordance with polar curves, an example of which is illustrated on FIG. 7 in the case of a wind of 2 meters/sec., but this orientation should be corrected on account of a few experimental parameters. Thus the jet engines interfere with each other. The first windward engine produces a jet which has a polar curve practically in conformity with FIG. 7. However the jet of the second engine is leeward of the first and therefore screened thereby, and its polar curve being distorted, its orientation with respect to the runway will have to be different from that of the first one in order to give to the cleared-up volume the largest base area on the runway. A similar situation applies in connection with the third engine, the orientation of which will have to be still further corrected to take into account the screening effect of the jets of the first two engines as far as the wind is concerned.

Such a plant is useful for clearing up the runway over an altitude of 20 to 30 meters along its whole length.

The following table gives the ranges of the jets as a function of the static thrusts of the turbojets involved.

| Thrust (in kgs. weight): | Range (distance from the axis of the runway in meters) |
| --- | --- |
| 2000–2500 | 80 |
| 2500–3000 | 85 |
| 3000–3500 | 90 |
| 3500–4000 | 100 |

The plant illustrated on FIGS. 1 and 2 (the latter being on a smaller scale) comprises a set of pivotable turbojets 1 arranged along a landing runway 2 from which they are separated by a strip of ground 3 coated preferably at least partly with a heat and wear resistant material. These figures may be completed by symmetry about the vertical plane AA through the axis of the runway 2. The turbojets 1 are equipped with nozzles which open above the ground so that their jet issues with an initial downward inclination, thus causing this jet to spread out and to form a sheet 4 adhering to the ground. This sheet induces ambient air which dilutes thereinto. The sheet thickens while its temperature and speed decrease as it comes nearer to the runway. When the sheet reaches the latter, its thickness is considerably increased and its speed low enough so that it forms, under the action of Archimedean forces, an ascending column of hot air over the runway, that is just in the zone to be cleared up.

In the case turbojets are positioned on both sides of a runway, these units are so adjusted that the opposite jets meet in the vicinity of the axis AA of the runway 2. These units being equidistant from the axis, this result will be achieved, in the absence of any wind, with identical runnings of the units. When the runway is subjected to a cross wind perpendicular to AA, the ascending column 5 has a tendency to lean in the direction of the wind. The prior situation is then restored by increasing the thrust of the units which blow in the direction opposite to that of the wind while reducing correspondingly the thrust of the units which blow in the direction of the wind. This operation is rendered possible by independent fuel flow controls for the units positioned on either side of the runway. A pipe-line 23 feeds each set of turbojets. It is even possible to stop completely the set which blows in the direction of the wind.

In the case of more or less oblique winds relative to the runway, the jets may be orientated accordingly. In the embodiment illustrated in FIG. 3, the jet engines 1 are for this purpose pivotably mounted on a vertical pivot 6 and oriented in the desired direction. It is however quite obvious that the same result is achieved in using an engine with a stationary body and an orientatable nozzle.

It is to be noted that the nozzle 7 of the jet engine shown in FIG. 3 is inclined toward the ground at an angle close to 3.5°. FIG. 4 shows that this latter value corresponds to a maximum of effectiveness for a turbojet used for fog dispersal.

An alternative form of nozzle with noise suppressing effect is illustrated in FIGS. 5 and 6 which show a stationary jet engine 1 equiped with a discharge nozzle 8 which alone pivots and is shaped into an annular outlet 9 with side inlets 10 for the suction of air by injector effect in order to reduce the noise of the jet. Such nozzles have been described in specification No. 2,973,825.

In order to increase the amount of heat applied, auxiliary burners may be provided on the path of the exhaust gases of some or all of the jet engines, for instance near the jets, in the air sucked in by induction thereby. Thus, in the embodiment of FIGS. 5 and 6, burners 12 which may be fed with very low cost fuel through a manifold 13, independently of the jet engines, are positioned opposite the side air inlets 10 of the discharge end 9.

FIG. 5 shows furthermore an underground arrangement of each jet engine fitted fixedly in a pit. The engine is secured by means of flanges 16 to cross-pieces 17 flush with the ground level, the intake air for the engine being sucked into the pit through a gate 18. Only the nozzle 8 protrudes above the ground and it may be made of sheet metal thin enough to avoid it being a cause of severe damage or accident to an aircraft making a serious mistake in course and taxiing casually over these nozzles, therefore quite far from the runway 2.

FIG. 7 shows the contours of the jet in plan view (on the ground), for a given wind W having for example a speed of 2 meters/sec., and for various orientations of the jet of a turbojet of 2500 kgs. weight thrust, the axis of this jet being designated in each case by an arrow leading to the polar curve obtained. It is thus quite clear that the general orientation of the turbojets with respect to the wind is of utmost importance, let alone their relative orientations to take into account interactions as set forth above.

What we claim is:

1. A process for dispersing fog over an aircraft runway having an approximately level surface and bounded laterally by areas having a surface at approximately the same level as said runway, which comprises directing high velocity hot gaseous compact jets generally toward said runway from selected spaced locations in said bounding area and at a distance from said runway, said locations being raised above the level of said surfaces and each of said jets having a velocity and temperature in the normal range of operating velocities and temperatures of conventional turbojet engines and having a central axis inclined downwardly from said respective raised location and intersecting said level intermediate said respective location and the runway whereby said jets originating at said locations above said level impact at an acute angle with said surface of said bounding area in a zone between said locations and said runway and flow along said bounding area surface and over the surface of the runway while hugging said surfaces and spreading laterally of said axes, the spacing of said locations being selected so that said jets upon spreading laterally become substantially contiguous.

2. A process as claimed in claim 1, comprising the further step of orienting said jets in azimuth about a substantially vertical axis, so that said jets are given a velocity component opposite to the wind.

3. A process as claimed in claim 1, wherein the angle of inclination of said direction of the jets with respect to said surface is included between substantially 2° and 5°.

4. A process as claimed in claim 3, wherein said angle of inclination is substantially 3.5°.

5. A process as claimed in claim 1, comprising the further steps of generating hot motive gas in the immediate vicinity of each of said selected locations and below said surface and leading said hot motive gas from below said surface to said raised locations above said surface to supply said jets originating therefrom.

6. A process as claimed in claim 1, comprising the further step of shielding said impact zone to protect the same against the erosive and corrosive action of said hot gaseous jets.

7. A process as claimed in claim 1, comprising the further steps of supplementing said hot gaseous jets with induced ambient air sucked in at said raised locations and burning fuel in the flow path of said induced ambient air.

8. A process as claimed in claim 1, in which the initial velocity of said jets is greater than 150 meters per second.

References Cited by the Examiner
UNITED STATES PATENTS

| | | | |
|---|---|---|---|
| 558,940 | 4/1896 | Frey | 239—14 |
| 2,756,097 | 7/1956 | Brandau et al. | 239—14 |

FOREIGN PATENTS 587,521  4/1947  Great Britain.

EVERETT W. KIRBY, *Primary Examiner.*